United States Patent Office 3,060,921
Patented Oct. 30, 1962

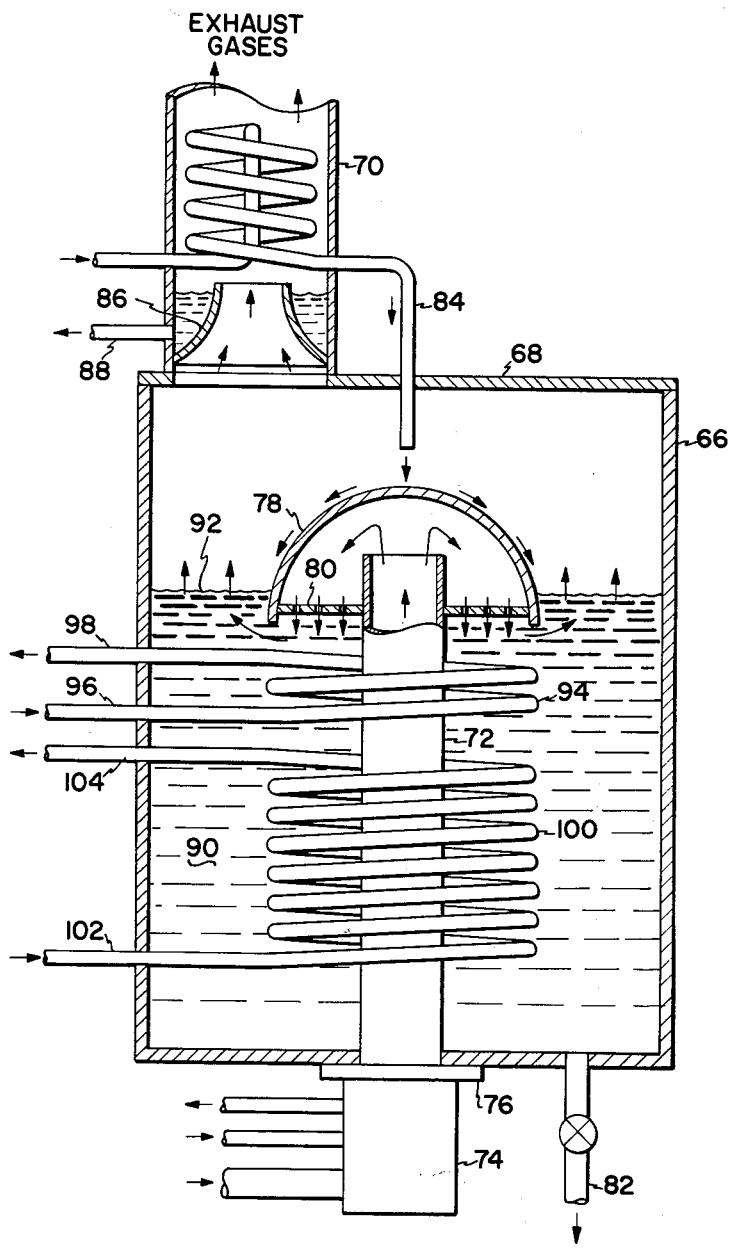

3,060,921
APPARATUS FOR HEATING LIQUIDS
William S. Luring, Elizabeth, Marvin B. Glaser, Plainfield, Charles W. Foust, Berkeley, and Joseph D. Soltis, Elizabeth, N.J., assignors to Esso Research and Engineering Company, a corporation of Delaware
Original application Aug. 12, 1958, Ser. No. 754,651. Divided and this application Dec. 9, 1960, Ser. No. 76,437
1 Claim. (Cl. 126—350)

This invention relates to apparatus for heating liquids, especially water. It relates particularly to such apparatus in which heat transfer to the liquid intended to be ultimately heated is effected through indirect thermal contact of this liquid with an intermediate body of liquid, especially an intermediate body of water. It relates more particularly to such apparatus in which heat is transferred into the aforementioned intermediate body of liquid by direct mixing therewith of gaseous products of combustion, and it relates more particularly still to such apparatus of a size and form adapted for installation in dwelling houses.

The present application is a division of co-pending application Serial No. 754,651, filed in the United States Patent Office on August 12, 1958.

Oil and gas-fired combustion units are widely used in dwelling house service for heating water to be circulated through radiators for space warming, and to issue from taps for washing, cooking, and other domestic purposes. In its usual embodiments, one of these units will comprise a furnace having a burner element, a combustion chamber, and a heat transfer conduit through which water to be heated is circulated, this conduit being located in or above the combustion chamber. Above or beyond the heat transfer conduit is a stack. Hot gaseous products of combustion flowing through the combustion chamber sweep over the exposed surfaces of the conduit, and heat is absorbed by water in this conduit from these products. Leaving the conduit region, the products of combustion flow up and out the stack.

On an average, the overall efficiency of combustion-type dwelling house water heating installations is less than 65%. This is largely the result of low heat absorption efficiency which averages around 72%. While there is a possibility of improving the absorption efficiency by careful redesign of burner and combustion chamber elements of water heating furnaces within the presently existing general configuration of these furnaces, it is considered that there will always be an irreducible heat loss of at least 15% in such furnaces because of stack requirements. This heat must be sacrificed to prevent condensation in the stack, and particularly to maintain a temperature differential for establishment of an updraft for a furnace in the basement of a dwelling house, the practically universal location.

According to this invention, the above-mentioned requirement for heat sacrifice for maintenance of proper stack conditions in water heating furnaces is avoided by employing the principle of submerged combustion. Gaseous products of combustion are discharged into a primary water body below the surfaces thereof. Heat transfer takes place from the gaseous products to the water body by direct mixing and at a very high volumetric rate, the gases finally escaping from the water surface.

The primary water body is in indirect thermal contact with and transfers heat to water which is circulated for home heating and domestic purposes. By appropriate configuration of the apparatus embodiment of this invention, the gaseous products of combustion may give up useful heat to water until they have ben cooled to as low as 100° F. No stack of any significant height will be needed because the positive drive imparted to the gases entering the primary water body obviates reliance on a draft effect. Further, because of high rates of volumetric heat transfer, the apparatus will be extremely compact and amenable to location in other than basement regions.

The nature and substance of this invention may be more clearly perceived and fully understood by referring to the following description and claims taken in connection with the accompanying drawing which represents a view in sectional elevation through a heating chamber suitable for use as a component of an apparatus embodiment of this invention in which gaseous products of combustion flow upwardly through a flue within the chamber to enter a water body retained therein. The chamber also contains coils immersed in the water body, through which coils water to be raised in temperature for home heating and domestic purposes is circulated.

Referring now to the drawing in detail, 66 designates a heating chamber which is provided with a roof 68. This roof has an opening about and above which is mounted a stack member or gas escape conduit 70. In the bottom of chamber 66 there is a central opening through which extends upwardly a flue 72 from a combustor unit 74 having suitable connections wherethrough it is supplied with air and fuel. This combustor has a water tight attachment to the bottom of chamber 66 through mounting flange 76. At its upper end flue 72 is provided with a cap 78 which is supported from the flue by means of a horizontal perforated plate 80.

At the bottom of the heating chamber there is a drain line 82. Entering the chamber through roof 68 and terminating above flue cap 78 is a line 84 wherethrough liquid may be supplied to the heating chamber. This line has a coiled configuration within gas escape conduit 70. Also within this conduit and below the coiled configuration of line 84 there is attached a flared circular member 86 whereby a collector trough region is formed at the base of the conduit. Leading away through the conduit wall from the trough region there is a drain line 88.

Within the heating chamber there is a water body 90 having a surface 92. This surface is maintained by suitable, well known means at a level somewhat if only slightly above perforated plate 80 but below the upper end of flue 72. Immersed in the water body below plate 80 are two pipe coils surrounding flue 72 and having inlet and outlet lines penetrating the wall of chamber 66. One coil 94 with inlet line 96 and outlet line 98 is intended to carry water to be heated for domestic purposes such as washing and cooking. The other coil 100 with inlet line 102 and outlet line 104 is intended to carry water to be heated for circulation through room radiators and snow melting coils.

When combustor 74 is fired, the hot gaseous products of combustion issuing therefrom will rise through and out of flue 72, and then be forced by cap 78 to flow downwardly through the perforations in plate 80 to form bubbles in water body 90 whereby this water will be heated directly. The water will also be heated to a relatively slight extent by conduction from the hot gases within flue 72 through the flue wall. On the other hand, the water surrounding the flue will keep the latter element relatively cool. As water streams for space heating, snow melting, and domestic purposes are passed through the coils immersed in water body 90, they will be raised in temperature by indirect heat transfer from this body.

The bubbles of gaseous products of combustion leaving the perforations in plate 80 on the underside thereof will finally escape around the edges of flue cap 78 and rise to and through water surface 92. Once free of this surface, these gaseous products will flow toward and through conduit 70. In passing through this conduit they will sweep over the surface of the coiled configuration of line 84 therein, giving up most of any potentially useful residual heat they may have to water flowing in this line.

It is evident that the gases flowing through conduit 70 and any water from water body 90 entrained as mist therewith may be cooled so low that condensation of certain vapors will take place on the inner surface of conduit 70 whereby liquid will be formed with a tendency to run back down the conduit and fall into the water body. This liquid may well be acidic, and may possibly pick up solid contaminants from the conduit inner surface or otherwise. In any case it had better be prevented from entering water body 90. Accordingly the function of the trough space formed in conduit 70 by circular element 86 is that of a sump in which this condensate liquid may be collected and from which it may be run off through drain line 88 to an appropriate disposal region.

Solids and unduly acidic water deposited and generated in chamber 66 may be drained off through line 82 either intermittently or continuously, and replenishment water supplied through makeup line 84. This inflowing water is directed onto flue cap 78. In this way the cap is cooled and the water absorbs heat which might otherwise be substantially wasted. The inflow of water through line 84 will at least slightly exceed the outflow through drain 82 to compensate for any evaporation and leakage effects.

The apparatus embodiment of this invention appearing in the drawing will be extremely compact in comparison with conventional heating plants used in residential buildings. Heat absorption efficiencies over 95% have been demonstrated in submerged combustion experiments performed in the laboratory. These efficiencies have been achieved at volumetric heat transfer rates up to 1,200,000 B.t.u./hr./ft.$^3$.

Put in terms of illustrated apparatus, if water body 90 had a volume of 1 ft.$^3$, it could absorb 1,200,000 B.t.u./hr. from combustion gases bubbling through it. The water body would, of course, have to be continuously discharging this absorbed heat to some other body or medium to avoid being boiled away itself. The high volumetric rate of heat transfer is a feature of this invention at least if not more startling than its high thermal efficiency. This high rate means that submerged combustion units for heating liquids will be light in weight as well as compact a characteristic noted already. No expensive, insulated stack of any height will be needed because exhaust gases are positively forced out of the apparatus. Very quiet operation may be expected. For these reasons a submerged combustion unit may be located in such hitherto unlikely locations for a heating plant as an attic or a first floor closet wherefrom a small gas escape conduit may be easily led away.

Although this invention has been described with a certain degree of particularity, it is to be understood that the present disclosure has been made only by way of example and that numerous changes in the details of construction and the combination and arrangement of parts may be resorted to without departing from the spirit and scope of this invention as hereinafter claimed.

What is claimed is:

An apparatus for heating liquids which comprises (1) a heating chamber having interior wall surfaces, (2) a first body of liquid wherewith said chamber is at least partially filled, (3) a combustor unit, (4) a flue wherethrough gaseous products of combustion are carried away from said combustor extending upwardly into said first body of liquid from said combustor, (5) means at least partially immersed in said first body of liquid whereby products of combustion leaving said flue are required to pass through at least part of said first body of liquid as a plurality of bubble streams, said means including in combination a plate member extending outwardly from said flue and characterized by a plurality of perforations and a cap member surmounting said plate member and enclosing the upper end of said flue, the combination of said plate and cap members being characterized by an outer edge region in spaced relation to said interior wall surfaces of said heating chamber to leave a passage between said region and said surfaces, (6) means whereby a second body of liquid may be brought into indirect thermal contact with said first body of liquid, (7) a conduit extending outwardly from said heating chamber wherethrough said products of combustion may be finally exhausted from said chamber, (8) means wherethrough replenishment liquid may be supplied to maintain said first body of liquid in said chamber, said means being in such spaced relation to said conduit that such replenishment liquid passing therethrough will come into indirect thermal contact with said products of combustion passing through said conduit, and (9) means for gathering and draining away vapors condensed to the liquid state within said conduit and deposited on the inner surfaces thereof.

References Cited in the file of this patent

UNITED STATES PATENTS

| | | |
|---|---|---|
| 883,407 | Jessup | Mar. 31, 1908 |
| 2,233,675 | Narten | Mar. 4, 1941 |
| 2,376,632 | Sullivan | May 22, 1945 |
| 2,810,382 | Warren | Oct. 22, 1957 |
| 2,878,644 | Fenn | Mar. 24, 1959 |
| 2,900,975 | Northcott | Aug. 25, 1959 |